United States Patent
Teng

(10) Patent No.: US 9,694,788 B2
(45) Date of Patent: Jul. 4, 2017

(54) AUTOMOBILE AND ANTI-THEFT METHOD FOR THE AUTOMOBILE

(71) Applicant: FIH (HONG KONG) LIMITED, Kowloon (HK)

(72) Inventor: Wen-Hua Teng, New Taipei (TW)

(73) Assignee: FIH (HONG KONG) LIMITED, Kowloon (HK)

(*) Notice: Subject to any disclaimer, the term of this patent is extended or adjusted under 35 U.S.C. 154(b) by 80 days.

(21) Appl. No.: 14/694,746

(22) Filed: Apr. 23, 2015

(65) Prior Publication Data

US 2016/0185318 A1 Jun. 30, 2016

(30) Foreign Application Priority Data

Dec. 30, 2014 (TW) .............................. 103146309 A

(51) Int. Cl.

| | |
|---|---|
| B60R 25/34 | (2013.01) |
| B60R 25/20 | (2013.01) |
| G08B 13/08 | (2006.01) |
| G08B 13/24 | (2006.01) |
| H04W 4/00 | (2009.01) |
| B60R 25/10 | (2013.01) |
| H01Q 1/32 | (2006.01) |
| H04W 4/02 | (2009.01) |
| G08B 23/00 | (2006.01) |

(52) U.S. Cl.
CPC .............. *B60R 25/34* (2013.01); *B60R 25/20* (2013.01); *G08B 13/08* (2013.01); *G08B 13/24* (2013.01); *H04W 4/008* (2013.01); *B60R 25/1001* (2013.01); *B60R 2325/10* (2013.01); *B60R 2325/103* (2013.01); *G08B 23/00* (2013.01); *H01Q 1/3283* (2013.01); *H04W 4/023* (2013.01)

(58) Field of Classification Search
CPC .................. H04W 4/008; H04W 4/023; B60R 2325/103; B60R 2325/10; B60R 2325/101; B60R 2325/105; B60R 25/34; B60R 25/20; B60R 25/01; B60R 25/1001; H01Q 1/3283; G08B 13/08; G08B 13/22; G08B 13/24; G08B 23/00
See application file for complete search history.

(56) References Cited

U.S. PATENT DOCUMENTS

| | | | |
|---|---|---|---|
| 6,203,060 B1 * | 3/2001 | Cech .................... | B60R 21/0136 180/274 |
| 7,212,895 B2 * | 5/2007 | Cech .................... | B60R 21/0134 701/45 |
| 8,798,809 B2 * | 8/2014 | Kalhous .................. | B60R 25/24 701/2 |

(Continued)

*Primary Examiner* — Jason Holloway
(74) *Attorney, Agent, or Firm* — Steven Reiss

(57) ABSTRACT

In an anti-theft method for an automobile, each of NFC devices on the automobile is activated to detect corresponding induction coils when the automobile receives a preset door locking command. The method confirms a status of each of the plurality of doors according to detecting whether each of the NFC devices detects the corresponding induction coil, and further determines whether at least one of the doors of the automobile is opened abnormally according to the confirmed status of each of the doors. When at least one of the doors of the automobile is determined to be opened abnormally, the method controls an alarm unit of the automobile to output a preset warning.

18 Claims, 3 Drawing Sheets

(56) References Cited

U.S. PATENT DOCUMENTS

| | | | | |
|---|---|---|---|---|
| 9,324,230 | B2* | 4/2016 | Chutorash | G08C 17/02 |
| 2002/0043024 | A1* | 4/2002 | Tanaka | B60R 25/00 |
| | | | | 49/13 |
| 2005/0143944 | A1* | 6/2005 | Cech | B60R 21/0134 |
| | | | | 702/115 |
| 2010/0164710 | A1* | 7/2010 | Chung | G01S 5/0018 |
| | | | | 340/539.1 |
| 2011/0313922 | A1* | 12/2011 | Ben Ayed | G06Q 20/108 |
| | | | | 705/42 |
| 2013/0244577 | A1* | 9/2013 | Cheikh | G07C 9/00309 |
| | | | | 455/41.1 |
| 2015/0208194 | A1* | 7/2015 | Ito | H04W 4/008 |
| | | | | 455/41.2 |
| 2016/0221501 | A1* | 8/2016 | Linden | E05B 81/72 |

* cited by examiner

AUTOMOBILE AND ANTI-THEFT METHOD FOR THE AUTOMOBILE

CROSS-REFERENCE TO RELATED APPLICATIONS

This application claims priority to Taiwan Patent Application No. 103146309 filed on Dec. 30, 2014, the contents of which are incorporated by reference herein.

FIELD

The subject matter herein generally relates to security technology of vehicles, and particularly to an automobile and an anti-theft method for the automobile.

BACKGROUND

Near field communication (NFC) technology is a short-range wireless technology, that enables mobile devices (e.g., smartphones or other devices) to establish radio communication with each other by touching the mobile devices together or bringing the mobile devices into proximity, typically a distance of 10 cm or less.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
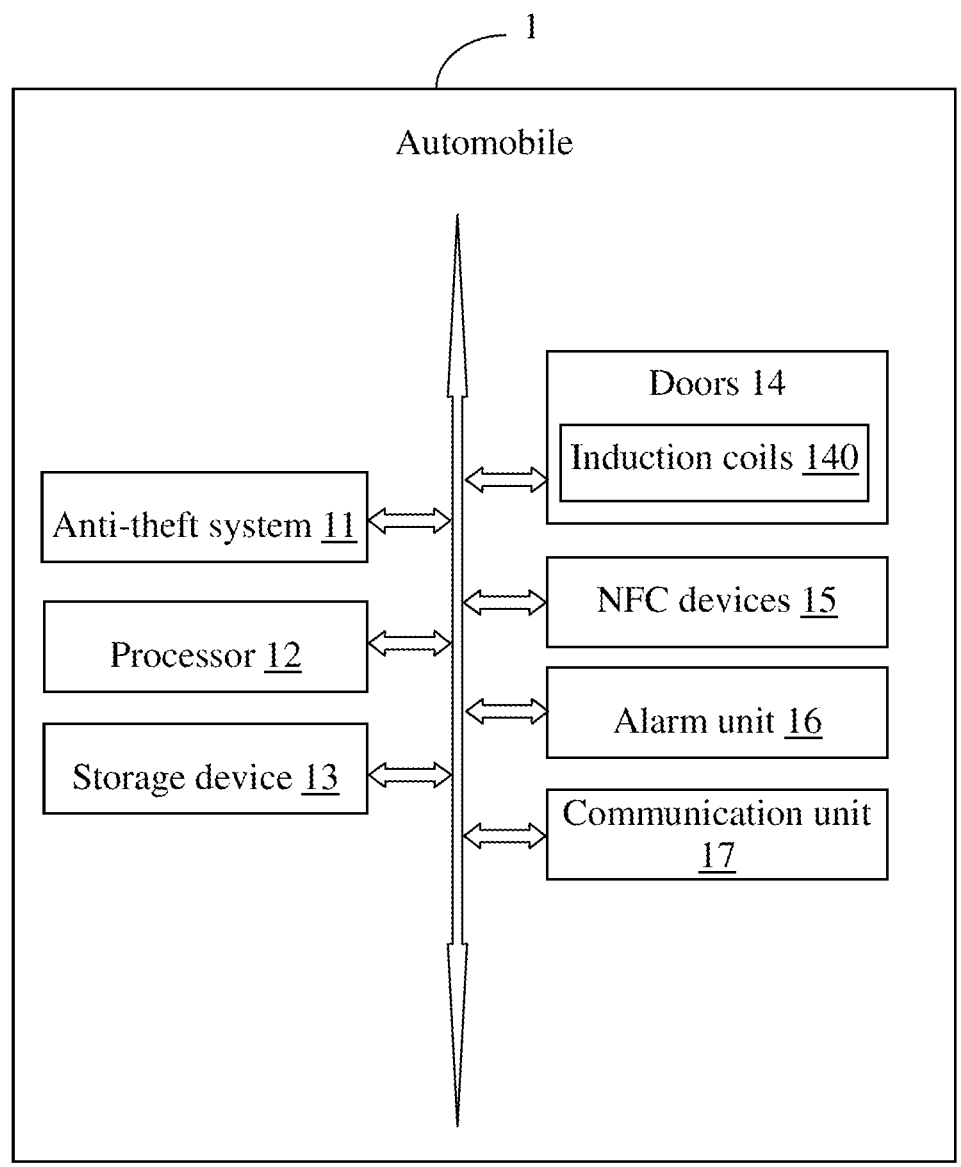
FIG. 1 is a block diagram of an example embodiment of an automobile.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules can be embedded in firmware, such as in an erasable programmable read only memory (EPROM). The modules described herein can be implemented as either software and/or computing modules and can be stored in any type of non-transitory computer-readable medium or other storage device. Some non-limiting examples of non-transitory computer-readable media include CDs, DVDs, BLU-RAY™, flash memory, and hard disk drives. The term "comprising" means "including, but not necessarily limited to"; it specifically indicates open-ended inclusion or membership in a so-described combination, group, series and the like.

FIG. 1 illustrates a block diagram of an example embodiment of an automobile. In at least one embodiment as shown in FIG. 1, an automobile 1 can include, but is not limited to, an anti-theft system 11, at least one processor 12, a storage device 13, a plurality of doors 14, a plurality of NFC devices 15, an alarm unit 16, and a communication unit 17. FIG. 1 illustrates only one example of the automobile 1, and other examples can comprise more or fewer components than those shown in the embodiment, or have a different configuration of the various components.

The at least one processor 12 executes one or more computerized codes and other applications (for example, an automobile system) of the automobile 1 to provide functions of the automobile 1. In at least one embodiment, when the automobile 1 receives a preset door locking command from one component (for example, a car key) of the automobile 1, the at least one processor 12 can execute a function of locking all of the doors 14 of the automobile 1. When the automobile 1 receives a preset door unlocking command from one component (for example, a car key) of the automobile 1, the at least one processor 12 can execute a function of unlocking all of the doors 14 of the automobile 1.

The storage device 13 can be an internal storage device, such as a random access memory (RAM) for temporary storage of information, and/or a read only memory (ROM) for permanent storage of information. The storage device 13 can also be an external storage device, such as an external hard disk, a storage card, or a data storage medium. Each of the doors 14 of the automobile 1 can be opened or closed. Each of the doors 14 includes an induction coil 140, which is installed on an outer side of each of the doors 14, and each of the induction coils 140 corresponds to an NFC device 15.

Each of the NFC devices 15 is installed on each door frame of a body (not shown in FIG. 1) of the automobile 1. The installation position of each NFC device 15 on the door frame is opposite to the installation position of each induction coil 140 on the outer side of the corresponding door 14. When one of the doors 14 is close to a corresponding door frame, a distance between the induction coil 140 on the outer side of the door 14 and the NFC device 15 on the corresponding door frame decreases. After the door 14 is closed, the distance between the induction coil 140 on the outer side of the door 14 and the NFC device 15 on the corresponding door frame is at minimum. When the distance between the NFC device 15 and the corresponding induction coil 140 is less than a preset distance threshold (for example, 10 cm), the NFC device 15 can detect the corresponding induction coil 140. If the distance between the NFC device 15 and the corresponding induction coil 140 is greater than or equal to the preset distance threshold, the NFC device 15 cannot detect the corresponding induction coil 140.

In at least one embodiment, the alarm unit 16 can be a loud speaker that can output a preset warning. The communication unit 17 can be communication modules of the automobile 1 that can send preset alarm information to a predetermined device. For example, the communication unit 17 can send a short message of "The door is opened abnormally, please check!" to a predetermined device based on a preset phone number. In at least one embodiment, the anti-theft system 11 can generate an alarm when at least one door 14 of the automobile 1 is opened abnormally according to detection of the NFC device 15.

Figure 2:
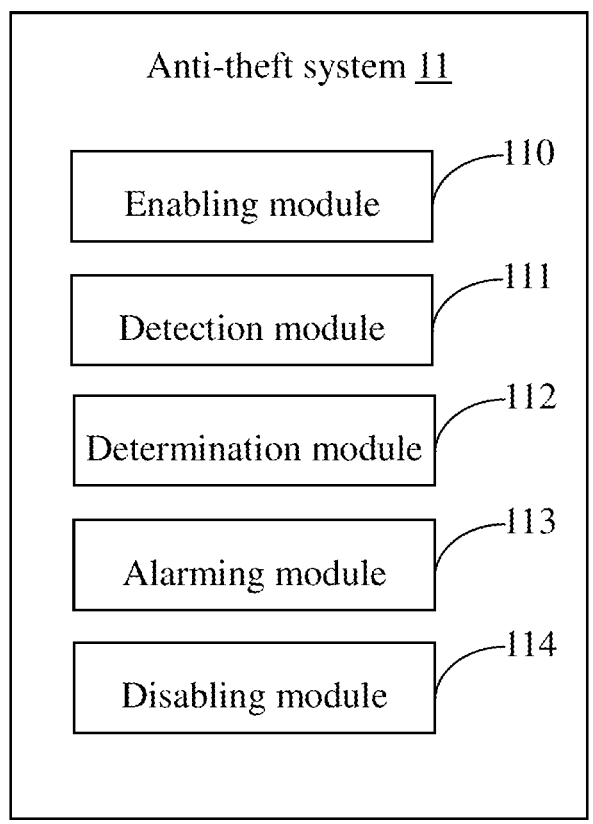
FIG. 2 is a block diagram of an example embodiment of an anti-theft system in the automobile of FIG. 1.

FIG. 2 illustrates a block diagram of an example embodiment of an anti-theft system in the automobile of FIG. 1. In at least one embodiment, the anti-theft system 11 can include, but is not limited to, an enabling module 110, a detection module 111, a determination module 112, an alarm module 113, and a disabling module 114. The modules 110-114 can include computerized instructions in the form of one or more computer-readable programs that can be stored in a non-transitory computer-readable medium, such as the storage device 13, and be executed by the at least one processor 12 of the automobile 1.

When the automobile 1 receives a preset door locking command, the enabling module 110 activates each of the plurality of NFC devices 15 to detect each of the plurality of induction coils. After receiving the preset door locking command, the automobile 1 can lock each of the doors 14 of the automobile 1.

The detection module 111 confirms a status of each of the doors 14 according to detecting whether each of the NFC devices 15 detects a corresponding induction coil 140. In at least one embodiment, if one NFC device 15 on a door frame detects an induction coil 140 on a corresponding door 14, the detection module 111 confirms that the door is in a closed status. If the NFC device 15 on the door frame does not detect the corresponding induction coil 140 on the corresponding door 14, the detection module 111 confirms that the door is in an opened status.

The determination module 112 determines whether at least one door 14 of the automobile 1 is opened abnormally, according to the confirmed status of each of the doors 14. If there is at least one door 14 in the opened status, the determination module 112 determines that at least one door 14 of the automobile 1 is opened abnormally. If all of the doors 14 of the automobile 1 are in the closed status, the determination module 112 determines that no door 14 of the automobile 1 is opened abnormally.

If at least one door 14 of the automobile 1 is opened abnormally, the alarm module 113 controls the alarm unit 16 to output a preset warning and further controls the communication unit 17 to send preset alarm information to a predetermined device.

If no door 14 of the automobile 1 is opened abnormally, the determination module 112 determines whether the automobile 1 receives a preset door unlocking command. In at least one embodiment, when the alarm unit 16 outputs the preset warning or when the communication unit 17 sends the preset alarm information to a predetermined device, the determination module 112 can also determine whether the automobile 1 receives the preset door unlocking command.

When the automobile 1 receives the preset door unlocking command, the disabling module 115 disables each of the plurality of NFC devices 15 to stop operating. After receiving the preset door unlocking command, the automobile 1 can unlock each of the doors 14 of the automobile 1. If the automobile 1 receives the preset unlocking command when the alarm unit 16 outputs the preset warning, the disabling module 115 can control the alarm unit 16 to stop outputting the preset warning.

Figure 3:
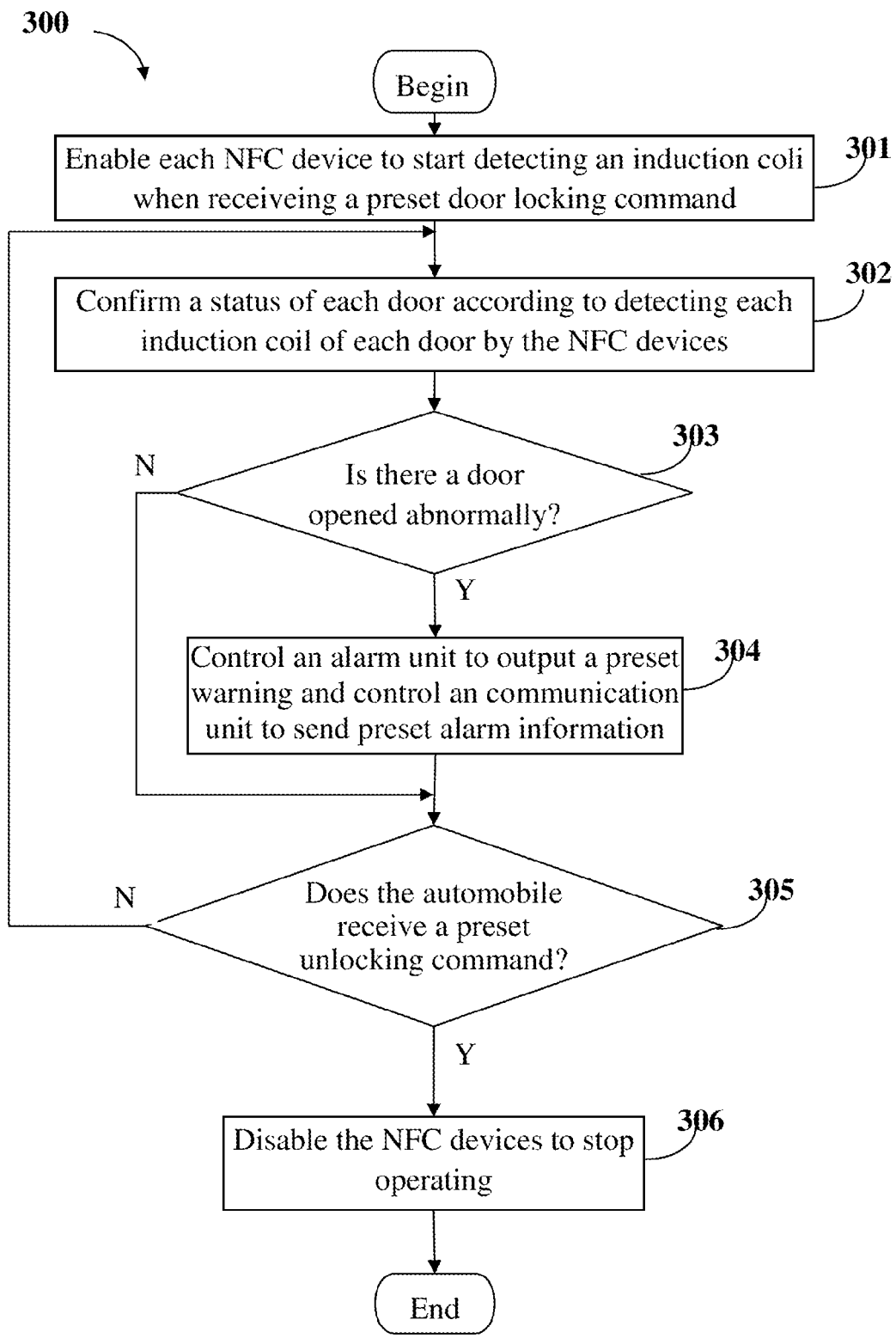
FIG. 3 is a flowchart of an example embodiment of an anti-theft method of the automobile of FIG. 1.

Referring to FIG. 3, a flowchart is presented in accordance with an example embodiment. An example method 300 is provided by way of example, as there are a variety of ways to carry out the method. The example method 300 described below can be carried out using the configurations illustrated in FIGS. 1-2, for example, and various elements of these figures are referenced in explaining the example method 300. Each block shown in FIG. 3 represents one or more processes, methods, or subroutines, carried out in the example method 300. Furthermore, the illustrated order of blocks is illustrative only and the order of the blocks can be changed. Additional blocks can be added or fewer blocks can be utilized without departing from this disclosure. The example method 300 can begin at block 301.

At block 301, an enabling module activates each of the plurality of NFC devices 15 to detect a corresponding induction coil, when the automobile 1 receives a preset door locking command. After receiving the preset door locking command, the automobile 1 can lock each of the doors 14 of the automobile 1.

At block 302, a detection module confirms a status of each of the doors 14 according to detecting whether each of the NFC devices 15 detects a corresponding induction coil 140. In at least one embodiment, if one NFC device 15 on a door frame detects an induction coil 140 on a corresponding door 14, that is, the door 14 is closed, the detection module 111 confirms that the door is in a closed status. If the NFC device 15 on the door frame does not detect the corresponding induction coil 140 on the corresponding door 14, that is, the door is not closed, the detection module confirms that the door is in an opened status.

At block 303, a determination module determines whether at least one door 14 of the automobile 1 is opened abnormally, according to the confirmed status of each of the doors 14. If there is at least one door 14 in the opened status, the determination module determines that at least one door 14 of the automobile 1 is opened abnormally, and block 304 is implemented. If all of the doors 14 of the automobile 1 are in the closed status, the determination module determines that no door 14 of the automobile 1 is opened abnormally, and block 305 is implemented.

At block 304, an alarm module controls the alarm unit 16 to output a preset warning and further controls the communication unit 17 to send preset alarm information to a predetermined device.

At block 305, the determination module determines whether the automobile 1 receives a preset door unlocking command. If the automobile 1 receives the preset door unlocking command, block 306 is implemented. If the automobile 1 does not receive the preset door unlocking command, block 302 is implemented.

At block 306, a disabling module disables each of the plurality of NFC devices 15 to stop operating. After receiving the preset door unlocking command, the automobile 1 can unlock each of the doors 14 of the automobile 1. If the automobile 1 receives the preset unlocking command when the alarm unit 16 outputs the preset warning, the disabling module can control the alarm unit 16 to stop outputting the preset warning.

All of the processes described above can be embodied in, and fully automated via, functional code modules executed by one or more general purpose processors such as the processor 12. The code modules can be stored in any type of non-transitory readable medium or other storage device such as the storage device 13. Some or all of the methods can alternatively be embodied in specialized hardware. Depending on the embodiment, the non-transitory readable medium can be a hard disk drive, a compact disc, a digital versatile disc, a tape drive, or other storage medium.

The described embodiments are merely examples of implementations, and have been set forth for a clear understanding of the principles of the present disclosure. Variations and modifications can be made without departing substantially from the spirit and principles of the present disclosure. All such modifications and variations are intended to be included within the scope of this disclosure and the described inventive embodiments, and the present disclosure is protected by the following claims and their equivalents.

What is claimed is:

1. An automobile comprising:
a plurality of doors;
a plurality of near field communication (NFC) devices;
a plurality of induction coils, each of the induction coils corresponding to one of the plurality of NFC devices;
at least one processor; and
a storage device storing one or more programs which, when executed by the at least one processor, cause the at least one processor to:
activate each of the plurality of NFC devices to detect a corresponding induction coil when the automobile receives a preset door locking command;
confirm a status of each of the plurality of doors when each of the plurality of NFC devices detects the corresponding induction coil;
determine whether at least one of the doors of the automobile is opened according to the confirmed status of each of the plurality of doors; and
control an alarm unit of the automobile to output a preset warning when at least one of the doors of the automobile is determined to be opened according to the confirmed status of each of the plurality of doors.

2. The automobile of claim 1, wherein each of the plurality of induction coil is installed on an outer of each of the plurality of doors, and each of the plurality of NFC devices is installed on each door frame of a body of the automobile, the installation position of each of the plurality of NFC device on each door frame being opposite the installation position of each of the induction coils on the outer side of each of the plurality of the doors.

3. The automobile of claim 2, wherein the at least one processor further:
determines whether the automobile receives a preset door unlocking command; and
disables each of the plurality of NFC devices to stop operating, when the automobile receives the preset door unlocking command.

4. The automobile of claim 2, wherein the status of each of the plurality of doors is confirmed by:
when one of the plurality of NFC device on the door frame detects the corresponding induction coil on the corresponding door, confirming the corresponding door is in a closed status; and
when the NFC device on the door frame does not detect the corresponding induction coil on the corresponding door, confirming the corresponding door is in an opened status.

5. The automobile of claim 4, wherein the at least one of the doors of the automobile is determined to be opened abnormally when the status of at least one of the doors is determined to be the opened status.

6. The automobile of claim 1, wherein the at least one processor further:
controls a communication unit of the automobile to send preset alarm information to a predetermined device when at least one of the doors of the automobile is determined to be opened according to the confirmed status of each of the plurality of doors.

7. A computer-based anti-theft method for an automobile, being executed by at least one processor of the automobile, the automobile comprising a plurality of doors, a plurality of near field communication (NFC) devices, and a plurality of induction coils, each of the induction coils corresponding to one of the plurality of NFC devices, the method comprises:
activating each of the plurality of NFC devices to detect a corresponding induction coil, when the automobile receives a preset door locking command;
confirming a status of each of the plurality of doors when each of the plurality of NFC devices detects the corresponding induction coil;
determining whether at least one of the doors of the automobile is opened according to the confirmed status of each of the plurality of doors; and
controlling an alarm unit of the automobile to output a preset warning when at least one of the doors of the automobile is determined to be opened according to the confirmed status of each of the plurality of doors.

8. The method of claim 7, wherein each of the plurality of induction coil is installed on an outer of each of the plurality of doors, and each of the plurality of NFC devices is installed on each door frame of a body of the automobile, the installation position of each of the plurality of NFC device on each door frame being opposite the installation position of each of the induction coils on the outer side of each of the plurality of the doors.

9. The method of claim 8, the method further comprising:
determining whether the automobile receives a preset door unlocking command; and
disabling each of the plurality of NFC devices to stop operating, when the automobile receives the preset door unlocking command.

10. The method of claim 8, wherein the status of each of the plurality of doors is confirmed by:
when one of the plurality of NFC device on the door frame detects the corresponding induction coil on the corresponding door, confirming the corresponding door is in a closed status; and
when the NFC device on the door frame does not detect the corresponding induction coil on the corresponding door, confirming the corresponding door is in an opened status.

11. The method of claim 10, wherein the at least one of the doors of the automobile is determined to be opened abnormally when the status of at least one of the doors is determined to be the opened status.

12. The method of claim 7, the method further comprising:
controlling a communication unit of the automobile to send preset alarm information to a predetermined device when at least one of the doors of the automobile is determined to be opened according to the confirmed status of each of the plurality of doors.

13. A non-transitory computer-readable medium having stored thereon instructions that, when executed by at least one processor of an automobile, causing the automobile to perform an anti-theft method for the automobile, the automobile comprising a plurality of doors, a plurality of near field communication (NFC) devices and a plurality of induction coils, each of the induction coils corresponding to one of the plurality of NFC devices, the method comprising:
activating each of the plurality of NFC devices to detect a corresponding induction coil, when the automobile receives a preset door locking command;

confirming a status of each of the plurality of doors when each of the plurality of NFC devices detects the corresponding induction coil;

determining whether at least one of the doors of the automobile is opened according to the confirmed status of each of the plurality of doors; and controlling an alarm unit of the automobile to output a preset warning when at least one of the doors of the automobile is determined to be opened according to the confirmed status of each of the plurality of doors.

14. The non-transitory computer-readable medium of claim 13, wherein each of the plurality of induction coil is installed on an outer of each of the plurality of doors, and each of the plurality of NFC devices is installed on each door frame of a body of the automobile, the installation position of each of the plurality of NFC device on each door frame being opposite the installation position of each of the induction coils on the outer side of each of the plurality of the doors.

15. The non-transitory computer-readable medium of claim 14, wherein the method further comprises:

determining whether the automobile receives a preset door unlocking command; and disabling each of the plurality of NFC devices to stop operating, when the automobile receives the preset door unlocking command.

16. The non-transitory computer-readable medium of claim 14, wherein the status of each of the plurality of doors is confirmed by:

when one of the plurality of NFC device on the door frame detects the corresponding induction coil on the corresponding door, confirming the corresponding door is in a closed status; and when the NFC device on the door frame does not detect the corresponding induction coil on the corresponding door, confirming the corresponding door is in an opened status.

17. The non-transitory computer-readable medium of claim 16, wherein the at least one of the doors of the automobile is determined to be opened abnormally when the status of at least one of the doors is determined to be the opened status.

18. The non-transitory computer-readable medium of claim 13, wherein the method further comprises:

controlling a communication unit of the automobile to send preset alarm information to a predetermined device when at least one of the doors of the automobile is determined to be opened according to the confirmed status of each of the plurality of doors.

* * * * *